United States Patent [19]

Kimlinger

[11] 4,021,784
[45] May 3, 1977

[54] CLOCK SYNCHRONIZATION SYSTEM
[75] Inventor: Joseph Anthony Kimlinger, St. Paul, Minn.
[73] Assignee: Sperry Rand Corporation, New York, N.Y.
[22] Filed: Mar. 12, 1976
[21] Appl. No.: 666,279
[52] U.S. Cl. ............................. 340/172.5; 178/69.1
[51] Int. Cl.² ...................................... G06F 15/16
[58] Field of Search .................. 340/172.5; 445/1; 178/69.5

[56] References Cited
UNITED STATES PATENTS

| | | | |
|---|---|---|---|
| 3,774,157 | 11/1973 | Tsui | 340/172.5 |
| 3,896,418 | 7/1975 | Brown | 340/172.5 |
| 3,921,149 | 11/1975 | Kreiss | 340/172.5 |
| 3,932,843 | 1/1976 | Trelut et al. | 340/172.5 |
| 3,934,232 | 1/1976 | Curley et al. | 340/172.5 |

*Primary Examiner*—Mark E. Nusbaum
*Attorney, Agent, or Firm*—Thomas J. Nikolai; Kenneth T. Grace; Marshall M. Truex

[57] ABSTRACT

In a fail soft synchronization clock system having a plurality of central processing units and a plurality of input-output units operably connected to one or more remotely located volatile cache memories there is provided a free-running, non-synchronized clock in each central processing unit. The clock outputs are connected to sets of synchronizing clock system logic circuits, one for each central processing unit, which disable the clocks of all other central processing units and selects their own associated clock as the input for producing a plurality of synchronized outputs employed in turn to time the operation of the processing system which is operably connected to the cache memories.

10 Claims, 10 Drawing Figures

CLOCK SYNCHRONIZATION SYSTEM

BACKGROUND OF THE INVENTION

1. Field of the Invention

This invention relates to clock systems employed to time the operation of processors and input-output units associated with cache memories. More particularly, this invention relates to a synchronizing clock system for providing a fail soft clock.

2. Discussion of the Prior Art

Most central processing units are provided with a source of central clock pulses which are employed to time the operation of the processing unit. Processing systems employing a limited number of input-output units and some external memory have employed the central clock pulses of the central processing unit to time the operation of the equipment outside of the central processing unit main cabinet. The timing of a system having a single central processing unit does not present a problem of synchronization because the system can be timed from a single master clock. If provisions for a fail soft clock system are required, a standby or back-up clock can be provided. The back-up clock can be synchronized with the active clock by phase lock loops or other known techniques.

Large data processing systems employ two or more central processing units, each having their own source of master clock pulses. Usually the master clock pulses are of a duration much shorter than the cycle and response times of the active components of the system or of the central processing units and the associated cache memories and/or the input-output units.

Several problems are presented when the master clock pulses of more than one central processing unit are present in a large data processing system. First, the clock pulses are usually of frequencies in excess of twenty megahertz, thus, individual pulse durations are less than twenty-five nanoseconds duration. The cables employed to connect the components of the system may be as long as twelve feet, thus, the time delay in the coaxial cables will exceed eighteen nanoseconds in each direction. It would not be possible to issue a request and receive acknowledgement between components of a large data processing system in the time duration of a single master clock timing pulse, accordingly, it is necessary to provide internal counters and associated circuits to generate cycle times within the individual components of the system. Since the cycle times of the individual components are synchronized by timing pulses from a remotely located master clock, the timing pulses will arrive after being delayed in the connecting cables.

Heretofore, delays of pulses were compensated for by placing additional compensating delay devices in the connecting cables so that similar master clock pulses arrived at all components in the system simultaneously. When more than one clock is to be employed in a large data processing system, the paths taken by the different master clock pulses will be different and the compensating delays would require being changed each time a different clock is to be employed.

Large data processing systems require alternative clocks as a safety precaution for at least two reasons. To make a large data processing system fail soft, there must always be a master clock system and a back-up clock system. These clocks must be synchronized. Clocks that are timed together in phase lock loops are not independent of each other and do not meet the general requirements of a fail soft system.

Another important reason for providing alternative master clocks in a large central processing system is that each system usually employs volatile solid state memory devices in a volatile cache memory. Volatile solid state cache memory devices are desirable because they can be made to operate much faster than nonvolatile type solid state memory devices. Volatile solid state memory devices lose or drop their stored data within a very short period of time if refresh address signals are not applied to the memory devices. It has become a preferred practice to time the refresh address signals of a cache memory with the master clock pulses of the data processing system to avoid interference with data being processed.

Yet another problem is presented in the use of very fast solid state memory devices for volatile solid state memories. When the solid state memory is ready to accept a request for the input or output of data it produces a signal equivalent to a ready signal at its interface internal gating circuits. When a stabilized request is present at the input of the solid state memory when the ready signal is first presented, the request is properly accepted and executed. A request which occurs while the ready signal is still stable is also properly accepted and executed, however, when the ready signal is terminated and the request signal is in a period of transition, the interface receiving circuit can propagate the transitional instability leaving the state of the receiver and the memory uncertain.

The problem with volatile solid state memory devices employing transistor-transistor-logic (TTL) and emitter-coupled-logic (ECL) at the receiving interface is that when the request is not stable when the ready signal terminates there is a period of instability referred to as metastability. For example, a commercially-available ECL flip-flop is specified to require data input stable a minimum of 0.1 nanosecond before and after the presentation of the enable or clock input to guarantee that a stable latch or change of state condition will be performed.

It is a requirement for large scale data processing systems to provide requests from all components which generate requests for a period in excess of that specified by semi-conductor manufacturers. It is impossible to meet this requirement without timing the output of the sending unit with the same master clock which times the ready signal of the cache memory interface receiver. This cannot be accomplished presenting synchronized timing pulses to the input of all the components in a large scale data processing system.

When the above problem of metastability is presented in a fail soft system and in a system where two or more master clocks are interchangeably employed, the problem is more complex.

SUMMARY OF THE INVENTION

It is a primary object of the present invention to provide a master clock system for a large scale data processing system having a plurality of central processing units, a plurality of input-output units and a plurality of volatile cache memories which comprise high-speed, solid state devices that exhibit metastability.

It is yet another primary object of the present invention to employ in a large scale data processing system one of the clocks of the central processing units to drive novel synchronizing clock system logic circuits which produce synchronized clock pulses employed to produce non-synchronized pulses employed as a master clock system.

It is another object of the present invention to provide in a large scale data processing system novel synchronizing clock system means which are programmed to select one of the clocks of the plurality of central processing units and to provide fail soft switching from one of the clocks to another.

It is another object of the present invention to provide in a large scale data processing system novel synchronizing clock system logic circuits which are associated with each central processing unit in the system. Said logic circuits are adapted to receive signals from a central processing unit newly coming on line and to interrupt the production of master clock signals until a determination is made as to which clock of the central processing unit shall be employed to produce the master clock signals.

It is another object of the present invention to provide a logic system for switching from one clock to another while maintaining an active large scale data processing system on line.

These and other objects of the present invention are provided in a system having a synchronizing clock system logic circuit comprising means for receiving clock pulses from the clocks of all central processing units in the processing system, means for selecting one of the clocks to be employed as a master clock pulse, means for producing synchronizing clock output pulses, and means for producing non-synchronized clock output pulses employed to drive all the components in the processing system.

BRIEF DESCRIPTION OF ALL THE DRAWINGS

FIG. 5 which consists of FIGS. 5a and 5b, is a more detailed schematic block diagram of the novel synchronizing clock system logic circuits shown in block diagram in FIG. 1.

DESCRIPTION OF THE PREFERRED EMBODIMENT

Figure 1:
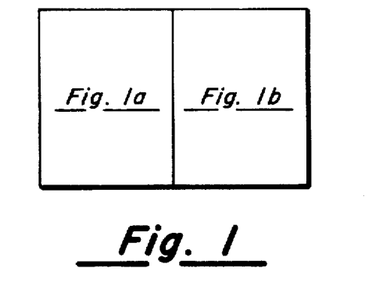
FIG. 1 which consists of FIGS. 1a and 1b, is a schematic block diagram of a large scale data processing system employing two central processing units.
Figure 1A:
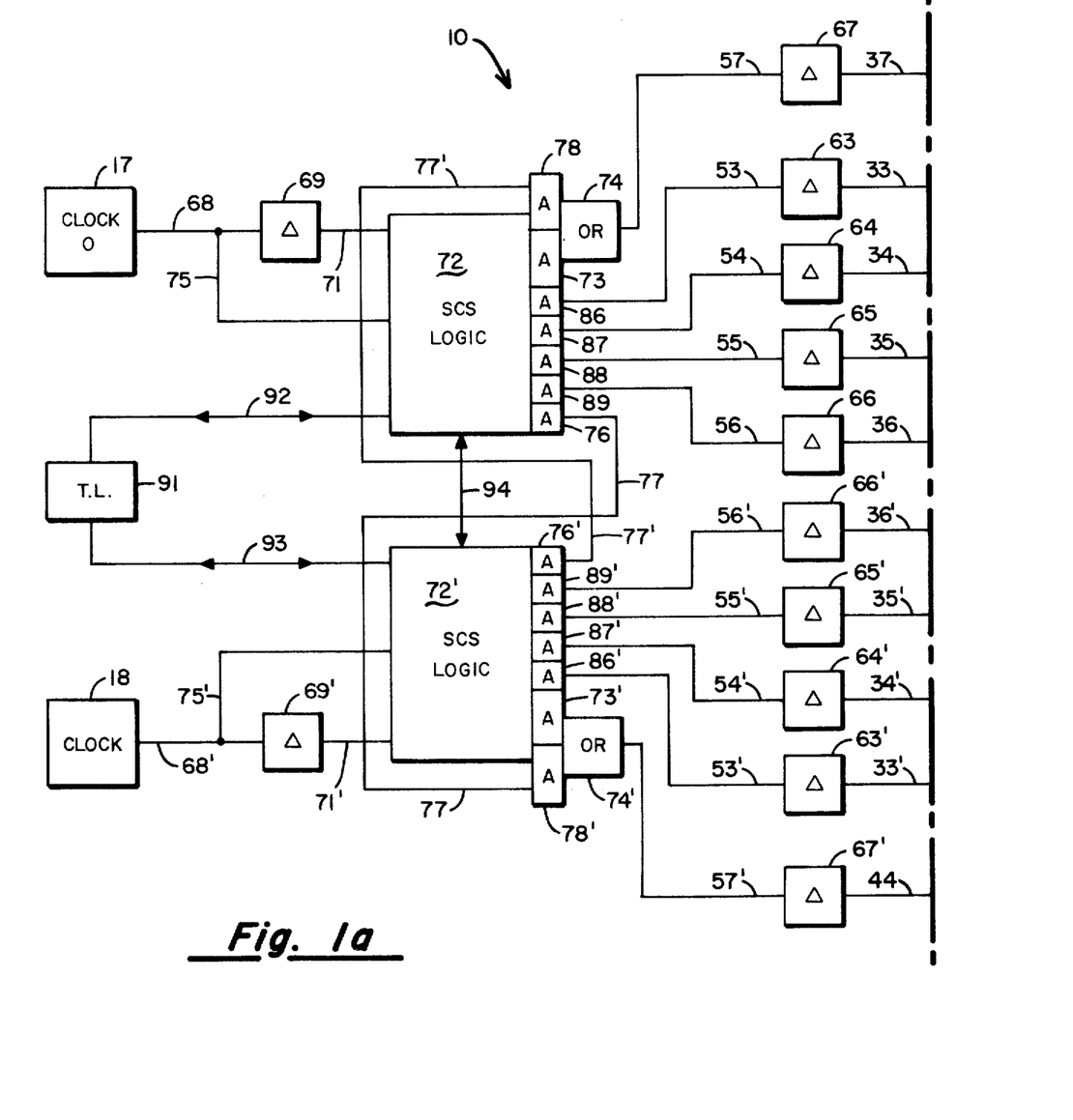
Figure 1B:
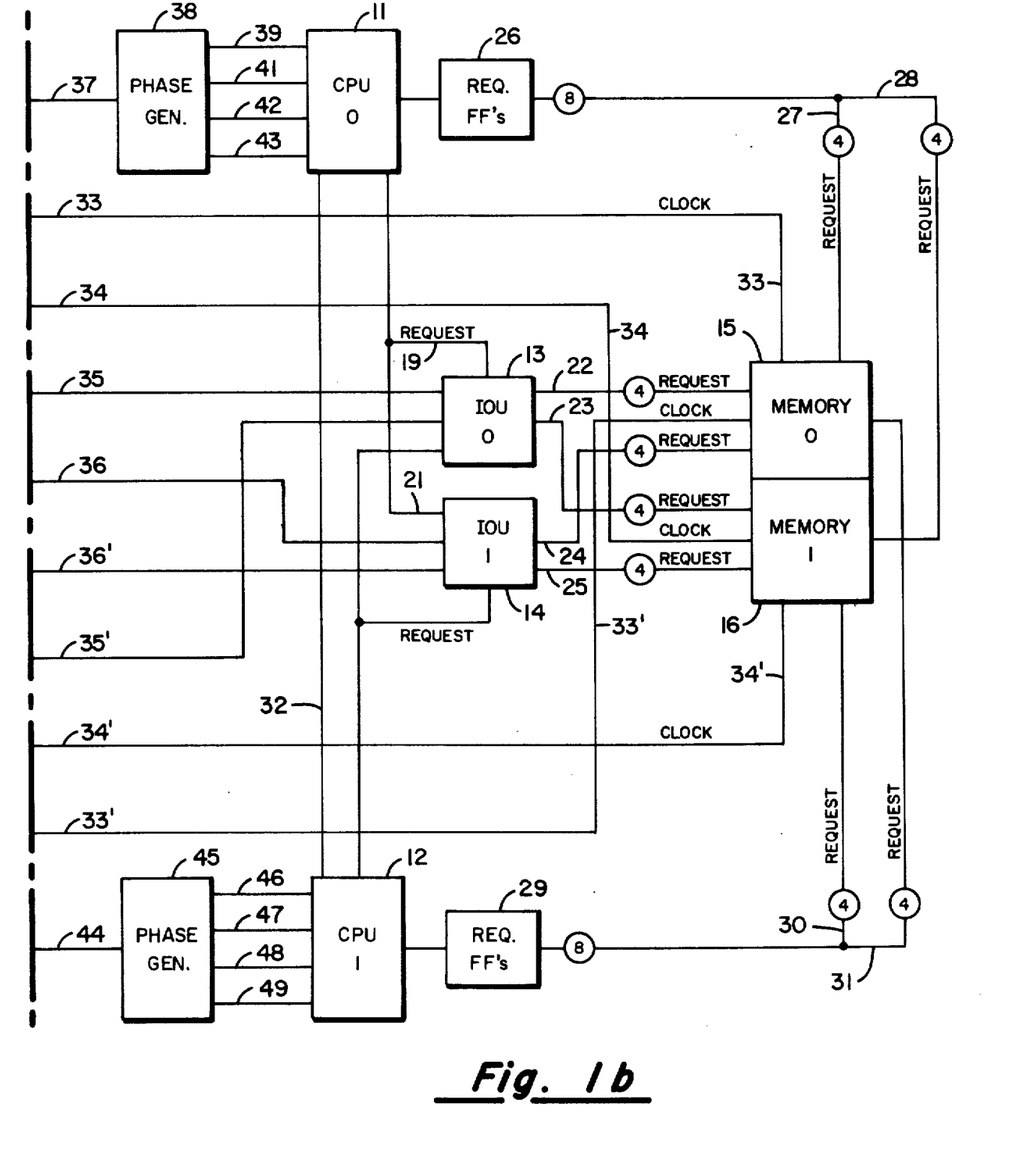

Refer now to FIG. 1 showing in block diagram a large scale data processing system. System 10 comprises central processing unit (CPU) 11 designated CPU 0 and central processing unit (CPU) 12 designated CPU 1. Both CPU's are operably connected to the input-output units 13 and 14 and the memories 15 and 16. CPU 11 has its own internal clock 17 and CPU 12 has its own internal clock 18 which are shown remote from the CPU's for purposes of clarity.

In normal operation CPU 11 generates a request to IOU 13 via bus 19 and to IOU 14 via bus 21. The memories 15 and 16 can accept the request and send back an acknowledgement to the IOU's followed by the transmission of data on lines in the same buses. Upon the completion of data transmission the IOU's 13 and 14 send back signals indicating the completion of the transmission of data to the CPU's 11 or 12, respectively.

Data may also be transmitted directly between the CPU's and the memories. CPU 11 generates requests at request flip-flops 26 on one of eight ports or lines. Four of the requests are transmitted on bus 27 to memory 15 and four of the requests are transmitted on bus 28 to memory 16. The acknowledged requests in the memories 15 and 16 are followed by the transmission of data back to the CPU's on the same buses. In the typical system described it is possible to have a request to memory 15 on lines 22, 24, 27 and 31 occurring at the same time. Similarly, it is possible for requests to be produced at the same time on lines 23, 25, 30 and 28 to memory 16. In order for the large scale data processing system 10 to be operable, the requests on the above mentioned lines must be presented to the respective memories immediately prior to the time that the memories raise a ready signal. When the clock signals from clock 17 are being employed to drive system 10 the signals on line 33 will be employed as clock signals to produce a delayed ready signal in memory 15 and the timing signals on line 34 will be employed to produce a delayed ready signal in memory 16. In order for the request to arrive at memories 15 and 16 before the ready signal is generated, the clock signals on line 35 to IOU 13 and on line 36 to IOU 14 must create outputs on their respective request lines which occur in time prior to the ready signals being generated at the interface at the memories 15 and 16, respectively. The timing signals on line 37 are applied to phase generator 38 to produce four phase signals on lines 38, 41, 42 and 43, respectively, which are employed as timing pulses to the input of CPU 11. As will be explained hereinafter, these phase pulses produce requests on buses 27 and 28 which raise requests prior to the initiation or generation of the ready signal in memories 15 and 16. Timing signals on line 44 are applied to phase generator 45 to produce phase related pulses on lines 46, 47, 48 and 49. The phase generated pulses are applied to CPU 12 to produce requests on lines 30 and 31 which are applied to the memories 15 and 16, respectively, prior to the time the ready signal is raised in these memories.

When clock 17 is inactive and clock 18 is active the timing pulses on lines 37 and 44 are the same as those explained previously. In similar manner when clock 18 is active the timing pulses to memory 15 are presented on line 33' and the timing pulses to memory 16 are presented on line 34'.

Figure 2:
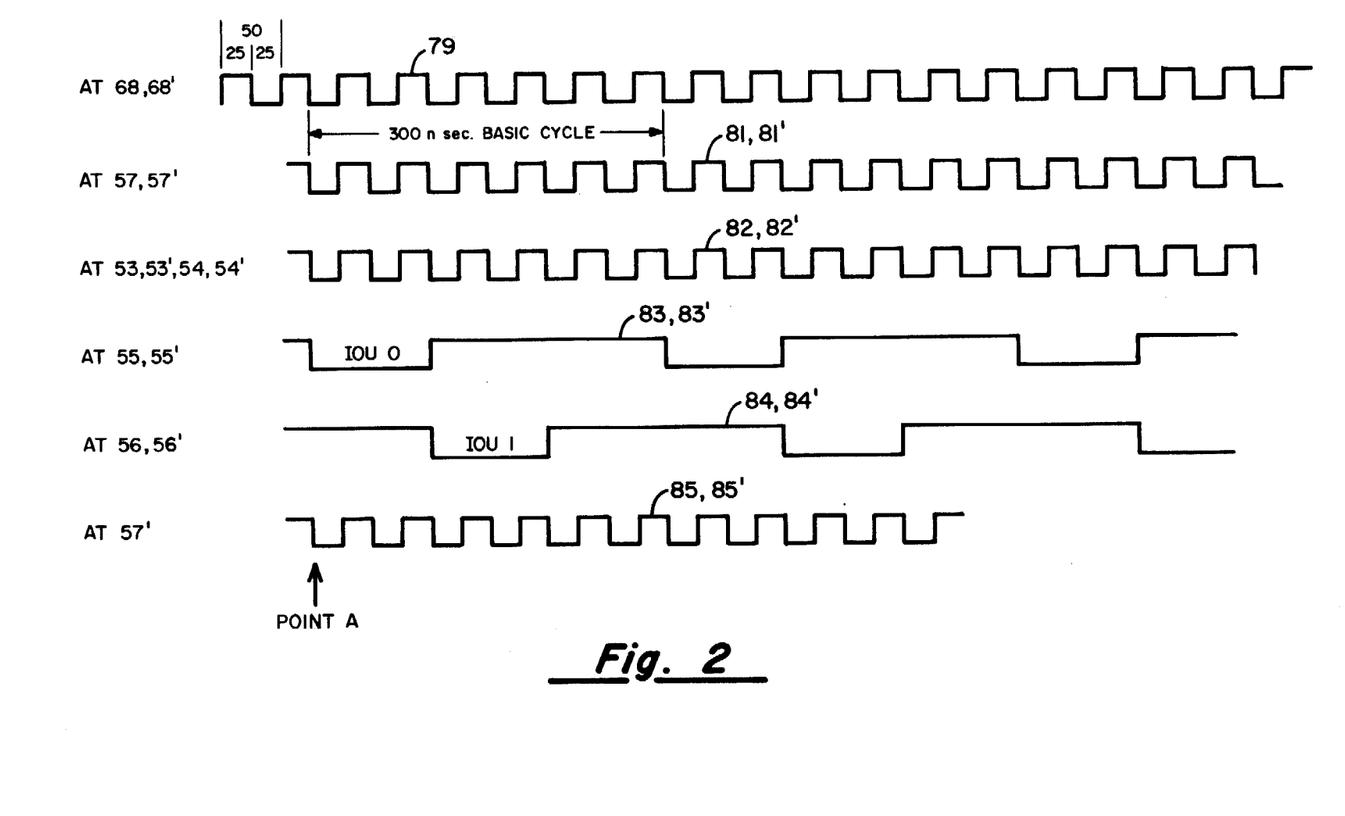
FIG. 2 is a timing chart showing the synchronized output pulses from the novel synchronizing clock system logic circuit shown in block diagram in FIG. 1.

The delayed synchronizing clock system (SCS) pulses on lines 33 to 37 shown opposite point B on FIG. 2 are non-synchronized pulses. The non-synchronized delayed SCS pulses on lines 33 to 37 are produced by synchronized SCS pulses on lines 53 to 57, respectively, shown at point A on FIG. 1. As will be explained in detail hereinafter, the non-synchronized delayed SCS pulses are produced from the synchronized SCS pulses by means of adjustable delays 63 to 67.

When clock 18 is active and clock 17 is inactive the non-synchronized SCS pulses on lines 33' to 36' and 44 are produced by adjustable delays 63' to 67', respectively, by employing synchronized SCS pulses on lines 53' to 57', respectively.

Refer now to FIG. 2 showing the pulses which occur at the point A of FIG. 1 entitled "Synchronized SCS pulses." When master clock 17 is active it is producing on line 68 a train of basic timing pulses 79 which have a pulse duration of approximately 25 nanoseconds. The pulse train 79 is applied to delay 69 having an adjustable delay up to 25 nanoseconds and the train 79 is applied to cable 71 connected to synchronizing clock system logic means 72. Pulse train 81 has shown on FIG. 2 a 300 nanosecond basic cycle time. The reason for using 300 nanosecond basic cycle time is that the IOU's 13 and 14 require 100 nanosecond start time and decision time each and clock switching time will require an additional 100 nanoseconds as will be explained. Pulse train 79 was applied on line 71 to SCS logic 72 and is also applied through levels of logic to AND gates 86 and 87 to produce pulse train 82 which appears at output lines 53 and 54. In similar manner pulse train 79 which is applied to SCS logic 72 is applied to AND gates 88 and 89 to generate pulse trains 83 and 84 which appear on lines 55 and 56, respectively. Pulse train 79 is also applied in SCS logic 72 to a series of levels of logic and an output at AND gate 76 is applied at line 77 to AND gates 78'. The output from OR gate 74' on line 57' appears as waveform 85 on line 57'. It will be noted that all the pulses generated by SCS logic 72 at the equivalent point in time shown as point A and shown as waveforms 81 to 85 are synchronized at point A. These synchronized SCS pulses on lines 53 to 57 and 57' are being produced as a result of the pulse train 79 emanating from master clock 17.

In a similar manner when clock 18 is active there is a pulse train like pulse train 79 being produced on line 68' and there is a plurality of synchronized SCS pulses being produced on lines 53' to 57' and 57 in synchronism similar to pulse trains 81 to 85. It will be understood that the synchronized SCS pulses appearing at point A on FIG. 1 after being delayed in the delays 63 through 67 and 63' through 67' are in various stages of delay depending on the actual equipment to which they are being applied and the cable delays connecting the equipment.

A preferred manner of tuning the circuits shown in FIG. 1 when master clock 17 is operable is to tune the request from CPU 11 with the ready signals being produced in memories 15 and 16 so that there is a five nanosecond delay in the presentation of the ready signals. Next a request is made into IOU's 13 and 14 from CPU 11 and the requests out of IOU 13 and 14 into memories 15 and 16 are tuned so that these latter requests occur five nanoseconds before the ready signals in memories 15 and 16. The next step in the tuning procedure is to initiate master clock 18. A request is initiated from CPU 12 to memories 15 and 16 and the request signal is tuned five nanoseconds before the initiation of the ready signal in memories 15 and 16. Next, the requests into IOU's 13 and 14 from computer CPU 12 are allowed to initiate requests out of IOU's 13 and 14 into memories 15 and 16 and these latter requests are tuned five nanoseconds before the initiation of the ready signals in memories 15 and 16. The last remaining adjustment is to tune CPU 11 so that its request which is being initiated from clock 18 pulses occurs five nanoseconds before the ready signal at memories 15 and 16. This is done by adjusting delay 69' while observing the requests being initiated by CPU 12 into memories 15 and 16. The request out of CPU 11 is made to coincide with the requests out of CPU 12 which have already been tuned and adjusted. In similar manner when CPU 12 is being run on master clock 17, delay 69 is adjusted so that the requests out of CPU's 11 and 12 coincide.

Assume now that SCS logic 72 has determined that its clock 17 is supposed to be driving the data processing system 10 and clock 17 is operable. When conditions change such that the SCS logic 72 recognizes that it is no longer supposed to have its master clock 17 driving system 10 some other CPU clock and its SCS logic will be making a determination that it is supposed to be driving the system 10. Assume that SCS logic 72' makes the determination that its clock 18 is supposed to take over driving system 10 from clock 17. SCS logic 72 informs SCS logic 72' on line 94 that a switching operation is going to occur. The switching operation which occurs in the SCS logic will be explained in detail hereinafter. However, the information concerning the SCS logic's control is being transmitted on buses 92 and 93 to transitional logic 91. If the logical switch does not occur, transitional logic 91 will inform SCS logic 72 via bus 92 that its clock 17 is supposed to resume or maintain driving control of system 10. The aforementioned mode of operation when both computers are operable is referred to as a mode 1 operation.

In a mode 2 operation one of the CPU's, such as CPU 11, its clock 17 and SCS logic 72 are operable when CPU 12 is attempting to come on line. The SCS logic 72' informs SCS logic 72 via bus 94 that it requires a resync which artificially produces a switching operation at SCS logic 72, interrupting the pulse trains occurring at point A. After a cycle or a multiple number of cycles SCS logic 72 and its clock 17 will resume control as the driving clock for the system. While it is not probable, it is possible that after SCS logic 72' comes on line its inputs can inform that its clock 18 is supposed to be driving system 10. When this occurs, SCS logic 72 will make a determination that its clock 17 is not supposed to be driving the system 10 and a switching operation, to be discussed in detail hereinafter, will occur placing clock 18 in active drive operation of system 10.

Figure 3:
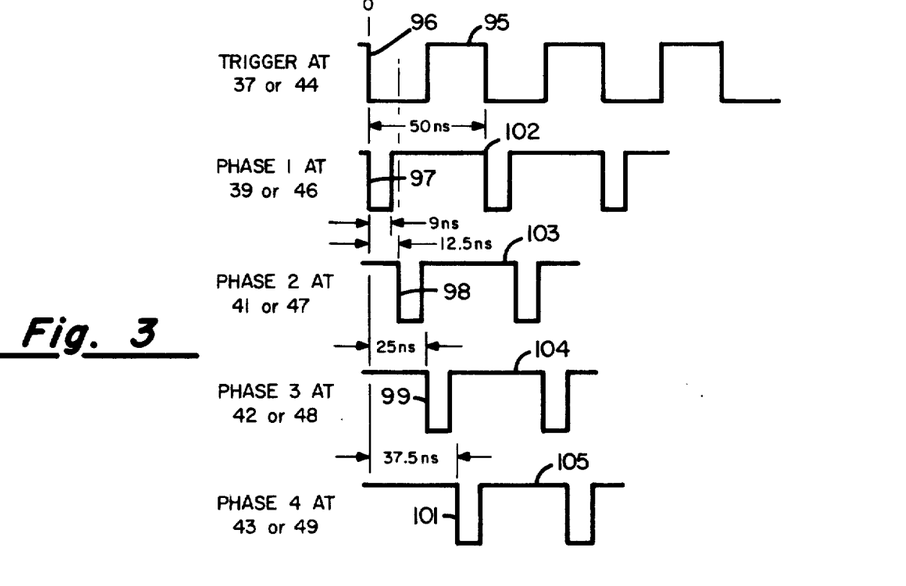
FIG. 3 is a timing chart showing the pulses generated by the pulse generator shown in block diagram in FIG. 1.

Refer now to FIGS. 1 and 3 showing phase generator 38 and outputs 39 through 43. Waveform 95 is being produced on line 37 as a result of the input of waveform 79 on line 57 being applied to delay 67. The trailing edge 96 of pulse train 95 is employed as a trigger connected to a delay line having 12½ nanosecond delay takeoff points. The trailing edge 97 is taken off of delay line (not shown) without any delay and a nine nanosecond pulse is generated through logic AND gating. The next trailing edge 98, occurring 12½ nanoseconds after trailing edges 96 and 97, is taken off at the first delay point. The next trailing edge 99 is taken off at two taps of the delay line, thus delayed 25 nanoseconds from trailing edge 96. The last trailing edge for phase four is generated 37½ seconds after generation of trailing edge 96. Each of the pulse trains 102 to 105 occurring on lines 39 to 43, respectively, represent phase one through phase four pulses, respectively, applied to CPU 11. Phase two is used to gate requests on buses 19 and 21 and the phase four pulse train 105 is used to time request flip-flops 26. In a similar manner phase generator 45 produces phase one to phase four pulses on lines 46 to 49.

Figure 4:
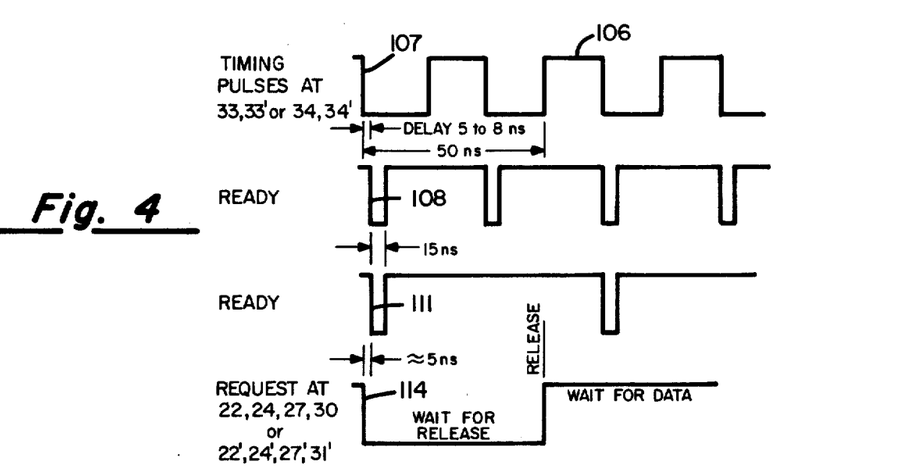
FIG. 4 is a timing chart showing the pulses at the memory shown in block diagram in FIG. 1.

Refer now to FIGS. 1 and 4. Pulse train 106 having pulses of 25 nanoseconds duration is shown having a leading edge 107 which occurs approximately eight to twelve nanoseconds before the leading edge 108 of ready signal pulse train 109. The pulse duration of the ready pulse is approximately 15 nanoseconds duration. The trailing edge 107 of pulse train 106 is also employed to trigger the trailing edge of ready signal pulse 111 of pulse train 112. If there is no request into the memories 15 and 16 when ready pulse 109 is generated, the ready pulse will be regenerated every 50 nanoseconds. If there is a request into the memories 15 and 16, the pulse train 112 will be generated and the ready pulse will be regenerated every 100 nanoseconds. The pulse train 113 is representative of the timing of a request relative to the ready signals of pulse trains 109 and 112. The trailing edge 114 of the request signal 113 has been tuned and timed to occur approximately five nanoseconds before the generation of the ready signals 109 or 112, as the case may be, and this pulse duration is active for approximately 85 to 90 nanoseconds going high and inactive waiting for data.

Figures 5, 5A:
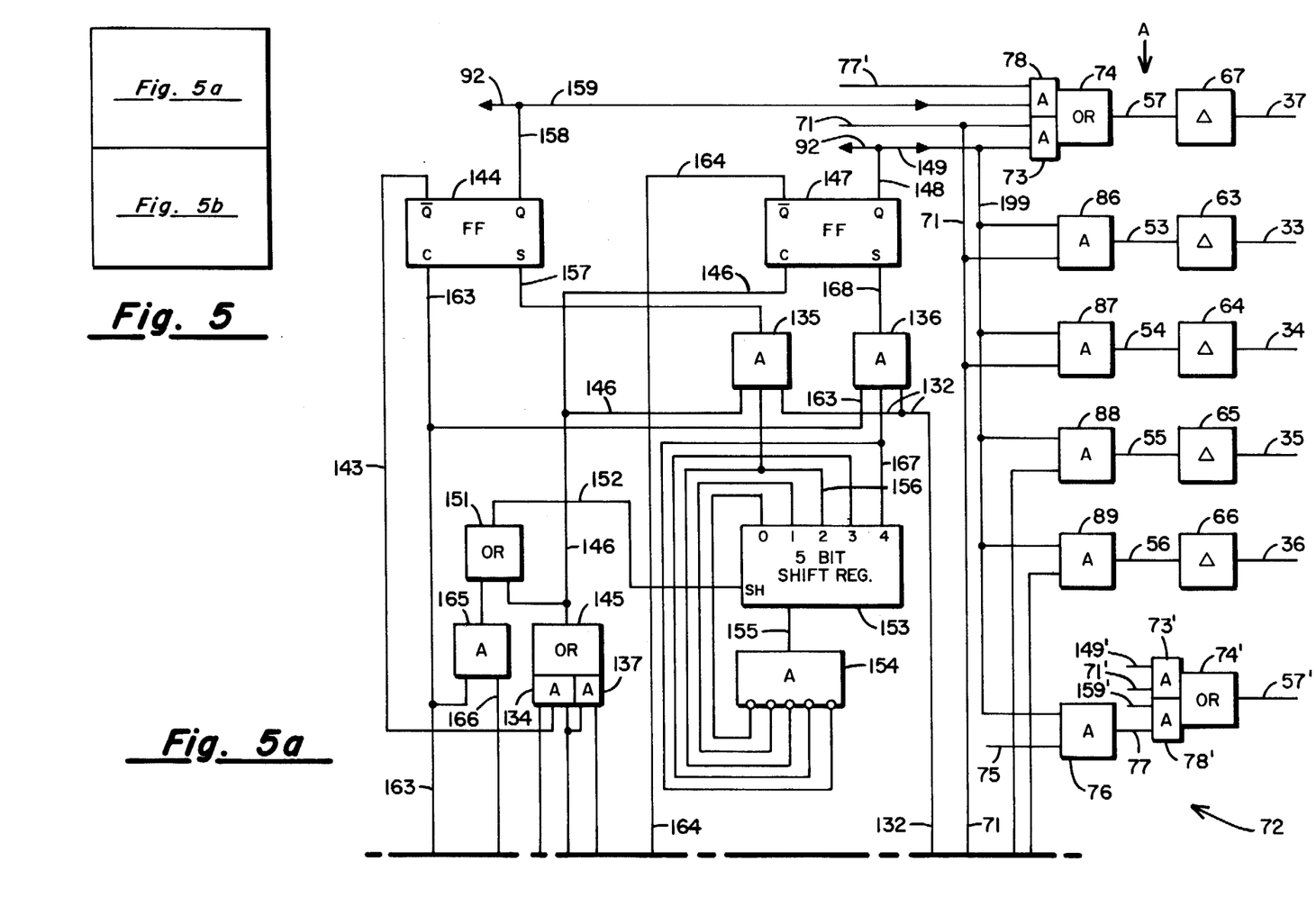
Figure 5B:
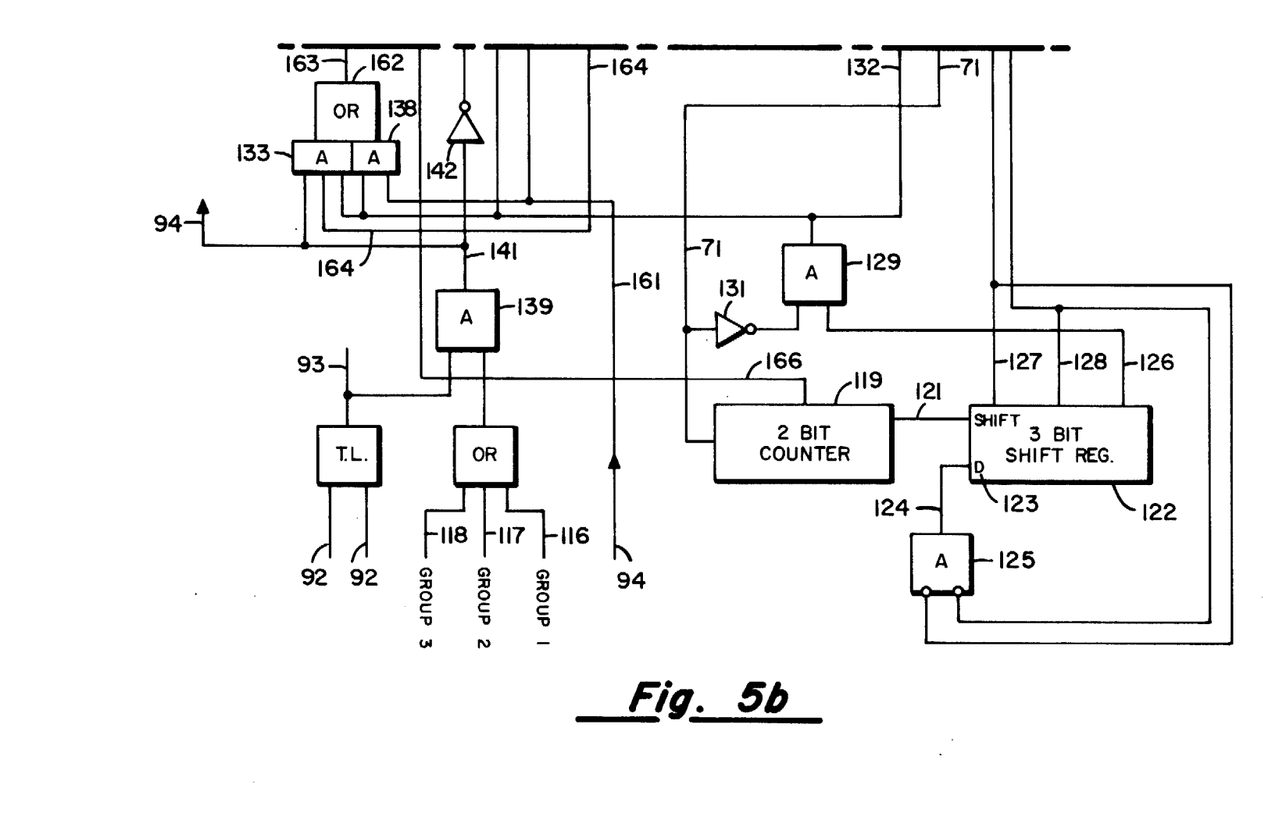

Refer now to FIGS. 1 and 5 which show a synchronizing clock system logic circuitry 72. In a first mode of operation the group 1 inputs on line 116 are representative of an error in the non-resident processor. Assume that resident CPU 11 is active and its clock 17 is driving the system 10, then CPU 12 is the non-resident processor. Typical conditions representative of group 1 are: (1) Connecting cables (i.e., bus 94) from CPU 12 are disconncted; (2) CPU 12 has powered down; (3) CPU 12 is off-line and CPU 11 is on line and its clock 18 is stopped. It is apparent that these group 1 conditions will force clock 17 to drive system 10.

In a first mode of operation the group 2 inputs on line 117 are representative of the result of a priority tree determination. Typical determination in this group 2 are: (1) The associated active CPU (i.e., CPU 11 and its clock 17) are running the highest assignable priority program; (2) All CPU's in the system are at the same level of priority and none of the CPU's has loaded its programs from memory; (3) All priorities in this system are at the same level of priority and one CPU has its program already loaded. While it is apparent in examples 1 and 3 above that the highest priority loaded CPU will supply the clock to the system, it is not apparent what clock will run the system in example 2. In example 2 the CPU with the lowest numerical assigned number is designated to assume command and supply the clock to the system. These group 2 conditions are subservient to the abovementioned group 1 conditions.

In a first mode of operation, the group 3 inputs on line 118 are representative of maintenance features. Typical conditions in this group 3 are: (1) The associated inactive CPU (i.e., CPU 11) is in a maintenance mode and its clock 17 is active; (2) A manual priority override switch in the maintenance panel has been switched to select one of the active CPU's and its clock to drive the system 10. It is apparent that in the above group 3 conditions the designated CPU is either selected or eliminated by a condition which overrides group 1 and group 2 conditions.

Assuming that system 10 is in a first mode of operation, transitional logic 91 is capable of overriding an error condition in the determination made by logic 72 on the basis of the group 1 to 3 imputs. Output buses 92 from logic 72 are connected as inputs to transitional logic 91. If the outputs to transitional logic 91 indicate that the decision outputs on lines 92 are in error, then transitional logic 91 will override the group 1 to 3 inputs and make the proper determination and selection.

It is apparent that transitional logic 91 serves merely as a check circuit in a fail soft system.

In a third mode of operation, a request for resynchronization from a non-resident CPU may generate a signal on bus 94. The signal on bus 94 temporarily overrides all other decisions and causes the resident CPU and its clock to enter into a switching operation mode in which the resident CPU and its clock are again reselected as the clock drive for the system 10.

Refer now to FIGS. 1, 2 and 5 showing point A. Synchronizing clock system logic means 72 receives its clock pulse train 79 as an input on line 71 which is connected to AND gates 73, 86 and 87. Also clock 17 pulse train 79 on line 71 is applied to the two bit counter 119. The output on line 121 is produced on the even count every 100 nanoseconds and is applied to the shift input of three-bit shift register 122. Self-loading shift register 122 has a data input 123 connected to AND gate 125 by line 124. AND gate 125 effectively generates a data input (i.e., "1") when there is no output at the first two positions of the shaft register. Thus, there is always a "1" being shifted through the shift register 122 generating a count at line 126 every 300 nanoseconds. Similarly, the count out on lines 127 and 128 defines the first 100 and latter 200 nanoseconds of the 300 nanosecond basic cycle shown on waveform 81. Waveform 83 is being produced on line 127 and waveform 84 is being produced on line 128.

A pulse train 79 is being applied to AND gate 76 via line 75. The output of AND gate 76 on line 77 is connected to AND gate 78' and the output passed through OR gate 74' to produce pulse train 85' on line 57.

The pulse trains on lines 57, 53, 54, 55 and 56 are shown as pulse trains 81, 82, 82, 83 and 84. It will be understood that a pulse train like pulse train 81' may be produced on line 57 by clock 18 when CPU 12 is resident and active. Pulse train 79' is applied to AND gate 78 when clock 18 is active producing a pulse train 81' on line 57. Similarly, when CPU 11 is resident and clock 17 is active, there is a pulse train 81 on line 57'. Pulse train 81 is applied to AND gate 73' and passed through OR gate 74' to produce a pulse train 81 on line 57'.

When clock 17 is active the basic cycle pulse train 81 is producing a 100 nanosecond wide pulse every 300 nanoseconds on line 126 which is applied to AND gate 129. Pulse train 81' on line 71 is inverted at inverter 131 and applied to AND gate 129 producing two test pulses every 300 nanoseconds on line 132. The test pulses on line 132 are applied to AND gates 133, 134, 135, 136, 137 and 138.

When the groups 1 to 3 conditions on lines 116 to 118, or the transitional logic 91 condition override, indicate that the clock 17 should become inactive, and another clock in the system 10 active, an output from AND gate 139 on line 141 is produced. The output on line 141 is inverted at inverter 142 and applied to AND gate 134. The third input to AND gate 134 on line 143 from flip-flop 144 indicates that the non-resident clock 18 is not active to drive system 10. The output of AND gate 134 passes through OR gate 145 and is applied via line 146 to the clear input of flip-flop 147.

The "Q" output of flip-flop 147 is driven to a nottrue state by the clear input generating a disable signal on line 148 and 149 which is applied to AND gates 73, 76, 86, 87, 88 and 89 effectively terminating the SCS pulses from these AND gates from SCS logic 72 at point A. The disable signal on line 148 is also applied to transition logic 91 via bus 92.

The output from OR gate 145 on line 146 is also applied to OR gate 151 producing a test signal on line 152. The two test pulses on line 152 are applied to the shift input of 5 bit self-loading shift register 153. All five outputs of shift register 153 are recirculated through NAND gate 154 to generate a true or "1" output signal on line 155 every 900 nanoseconds.

Output number 2 of shift register 153 on line 156 is applied to AND gate 135. Lines 132 and 146 inputs to AND gate 135 are also true producing an output pulse on line 157 which is applied to the set input of flip-flop 144. Flip-flop 144 raises an enable pulse at the "Q" output on line 158 which is applied to AND gate 78 via line 159. The true condition on line 158 is also applied to bus 92 and applied as an input to transitional logic 91.

The condition indicating that clock 17 should become inactive on line 141 is also applied to bus 94 which is connected to logic 72' of the non-resident computer. Effectively, the indication on bus 94 is informing the SCS logic 72' to make its clock 18 the resident driving clock for system 10.

Bus 94 is bi-directional and connects SCS logics 72 and 72'. Resident logic 72 has terminated its synchronizing SCS pulses and ordinarily non-resident logic 72' would be switched on. However, for purposes of the explanation to follow, assume that CPU 12 and logic 72' was the resident logic and is switching on logic 72. The indication to switch on is also applied via bus 94 to line 161. Line 161 is connected to AND gates 137 and 138. The signal from AND gate 137 produces an output pulse through OR gate 145 to line 146 which is connected to the clear input side of flip-flop 147 which was already clear. The switching signal on line 161 at AND gate 138 passes through OR gate 162 to line 163 because AND gate 138 is enabled by the test pulses on line 132. It will be understood that all logics are producing their own test pulses on lines 132, 132', etc. The pulse on line 163 is applied to the clear side of flip-flop 144 producing a disable on line 158 from the "Q" output. Line 158 is connected to bus 92 and to line 159. The disable signal on line 159 disables AND gate 78 and therefore the pulse train 81 on line 57.

The three inputs to AND gate 133 are true. The cleared flip-flop 147 produces a true output at Q on line 164, and the test pulse on line 132 is repetitively true. When AND gate 139 indicates that switching is to occur, an enable pulse has been produced on line 141 which is applied to AND gate 133 and to inverter 142. This latter pulse will not clear flip-flop 147 via OR gate 145 and line 146. The output of AND gate 133 passes through OR gate 162 and is applied via line 163 to the clear side of flip-flop 144 and to an input of AND gate 165. The two-bit counter 119 raises its enable pulse on line 166 every 100 nanoseconds. The output of AND gate 165 passes through OR gate 151 to line 152. The signal generated on line 152 is connected to the shift input of 5-bit shift register 153. The output signal from the number 4 output of shift register 153 is applied via line 167 to AND gate 136. AND gate 136 is already enabled by lines 163 and 132. The output pulse from AND gate 136 is applied via line 168 to the set side of flip-flop 147. The enable output signal from the "Q" output of flip-flop 147 is applied via line 148 to bus 92 and to line 149. The enable signal on line 149 enables AND gates 73, 76, 86, 87, 88 and 89, thus producing the synchronizing SCS pulses at point A of logic 72.

Figure 6:
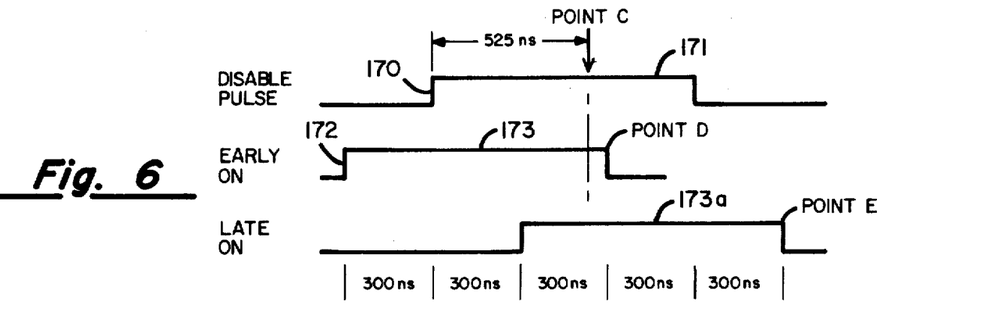
FIG. 6 is a timing chart showing the switching clock pulse or disabling pulse generated by the synchronizing clock system logic circuits shown in FIG. 5.

It will be understood that logic 72 in being switched on by logic 72' causes a period in time in which no synchronized SCS pulses are being generated at point A. Refer now to FIG. 6. The high or true condition of pulse 171 represents the time in which former resident logic 72' has been switched off. The leading edge 170 of pulse 172 indicates the start of logic 72' being switched off. Pulse train 173 is not a generated pulse but is shown here to represent the earliest deviation in time during which logic 72 may be switched on by its repetitive test pulses andd the indication on bus 74. Point "C" on pulse 171 occurs 525 nanoseconds after leading edge 170 and will always occur during the duration of time represented by pulse 173. Pulse 173a represents the latest deviation in time during which logic 72 may be switched on by its repetitive test pulses and the indication on bus 94.

Point "D" on pulse 173 represents the earliest time relative to pulse 171 that logic 72 may be turned on and point "E" of pulse 173a represents the latest point in time relative to pulse 171 in which logic 72 may be turned on. Pulse trains 171, 173 and 173a are shown to illustrate that the synchronizing SCS pulses can be turned off and back on for an integral number of basic cycle times. The switching on will occur during the second basic cycle time or at the latest during the fourth basic cycle time, but in no occasion requiring more than 1.2 microseconds. Since there are no timing pulses being applied to system 10, no data can be lost.

Having explained a preferred embodiment of the present invention and a method for switching from one non-synchronized clock to another employing only two CPU's and one detailed SCS logic, it will be understood that the same mode of operation is employed when greater than two CPU's are embodied in a large scale data processing system. Each CPU will require an SCS logic like logic 72. Modification of the gating circuits before the inputs of OR gates 74, 145 and 162 to provide a proper fan in of other logic pulses will allow expansion of the system by adding CPU's.

What is claimed is:

1. A fail soft synchronization clock system for a plurality of central processing units operably connected to remotely located volatile cache memory means, comprising:
a plurality of central processing units,
a clock in each central processing unit adapted to generate non-synchronized clock pulses of the same time duration,
a plurality of input-output units,
volatile cache memory means connected to said input-output units and to said central processing units for receiving generated requests from said units for the input or output of data in said memory,
synchronizing clock system logic means having inputs connected to the outputs of said clocks,
said synchronizing clock system logic means comprising control gating means for determining which central processing unit clock shall be connected to said central processing units, said input-output units and to said volatile cache memory means and for connecting the selected central processing unit clock to said units and said memory means, said synchronizing clock system logic means further including means for generating a plurality of timed outputs synchronized one with the other, each of said plurality of timed outputs being connected by individual lines to one of said input-output units, said central processing units and to said volatile cache memory means, and adjustable delay means in each of said individual lines for producing non-synchronized clock pulses, whereby said input-output units and said central processing units generate requests for the input or output of data immediately prior to the volatile cache memory means being enabled by the non-synchronized clock pulses to accept a request for the input or output of data.

2. A fail soft synchronization clock system as set orth in claim 1, wherein said synchronizing clock logic means synchronized outputs are timed by the central processing unit clock selected to be operably connected to said central processing units, said input-output units and to said volatile cache memory means, and which further includes, adjustable delay means connected between the input of the synchronizing clock system logic means and to the selected clock.

3. A fail soft synchronization clock system as set orth in claim 2 wherein said synchronizing clock logic neans further comprises a set of logic circuits for each entral processing unit for selecting the clock associated with its own central processing units, said set of ogic circuits further having its own non-synchronized lock inputs and including means for generating synchronized outputs, and delay means for producing non-ynchronized clock pulses from said synchronized outputs.

4. A fail soft synchronization clock system as set orth in claim 3 which further includes a transactional ogic unit for comparing the decision made at each set if logic circuits and for overriding an incorrect decision made by said logic circuits.

5. A fail soft synchronization clock system as set orth in claim 1 wherein said synchronizing clock sysem logic further includes, means for switching from one clock to another during continuing operation of one or more central processing units.

6. A fail soft synchronization clock system as set forth in claim 5 wherein said means for switching from one clock to another comprises gating circuits for blocking the outputs from said synchronizing clock system logic means for a predetermined number of clock pulses.

7. A fail soft synchronization clock system as set forth in claim 1 wherein said synchronized output from said synchronizing clock system logic means further include an enabling clock pulse for each input-output unit, each said enabling clock pulse having an active request portion occurring in time apart from the other active request portions.

8. A fail soft synchronization clock system as set forth in claim 7 wherein said synchronizing clock system logic means further includes means for generating an internal switching clock pulse having an active switching time for selectively disabling all of said outputs from said logic for one or more basic cycle times.

9. A fail soft synchronization clock system as set forth in claim 8 wherein said internal switching clock pulse occurs after said active request portion of said input-output enabling clock pulses and before the end of basic cycle time, and further including internal logic gating means for enabling said outputs from said logic means during a subsequent basic cycle time and during said active switching time.

10. A fail soft synchronization clock system as set forth in claim 8 which further includes means for generating a guard pulse beginning before, and ending before, the start of said active switching time of said internal switching clock pulse, said guard pulse being connected to the clock of the central processing unit which is connected to said synchronizing clock system logic means, and means for generating an enabling pulse after terminating said guard pulse and during said active switching time pulse for informing the non-resident clock.

* * * * *

UNITED STATES PATENT AND TRADEMARK OFFICE
CERTIFICATE OF CORRECTION

PATENT NO. : 4,021,784
DATED : May 3, 1977
INVENTOR(S) : Joseph Anthony Kimlinger It is certified that error appears in the above-identified patent and that said Letters Patent are hereby corrected as shown below:

Column 12, Claim 7, Line 2 thereof, "output" should be -- outputs --.

Signed and Sealed this nineteenth Day of July 1977

[SEAL]

Attest:

RUTH C. MASON
*Attesting Officer*

C. MARSHALL DANN
*Commissioner of Patents and Trademarks*